Figure 1:
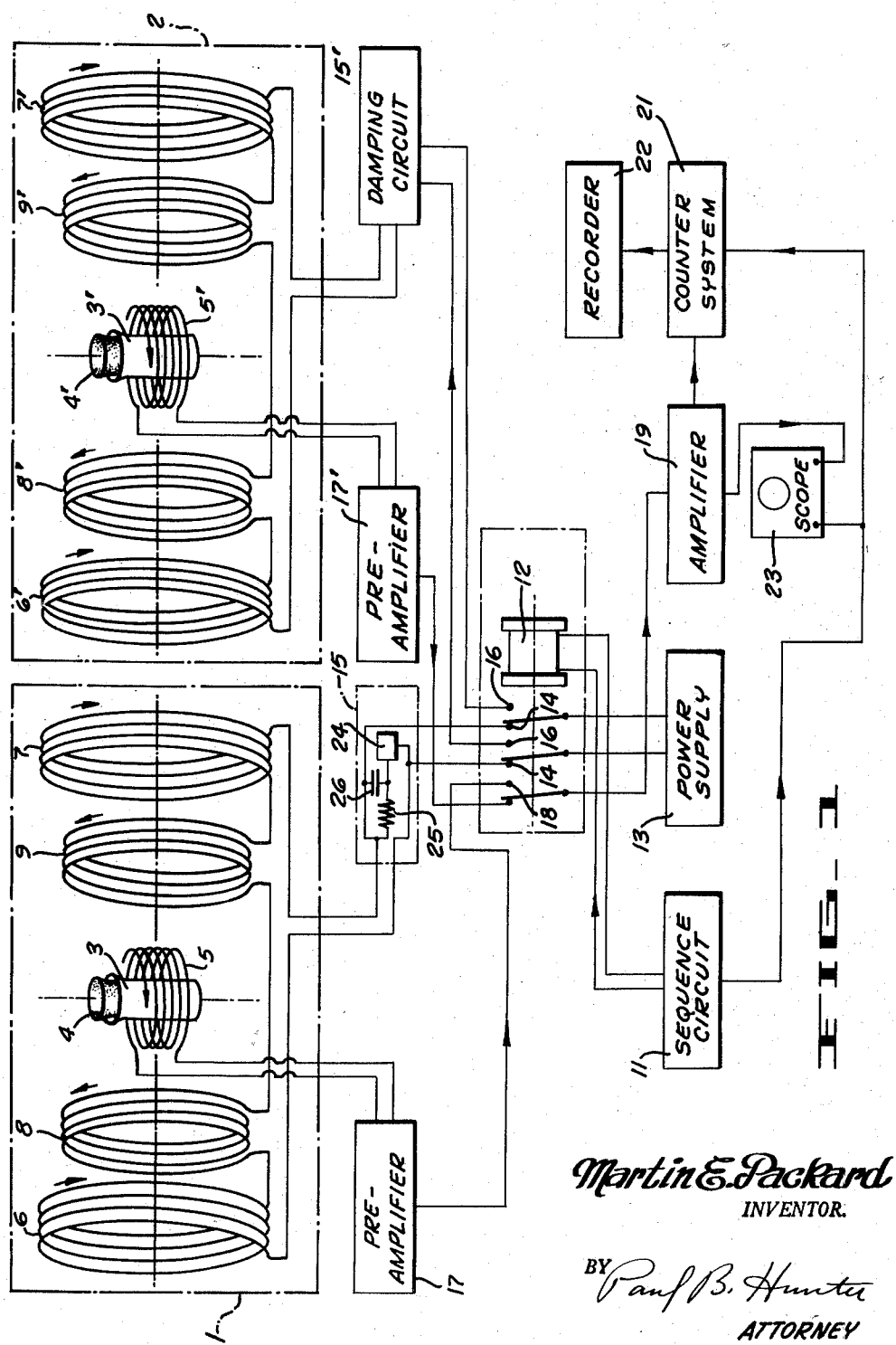

Oct. 14, 1958

M. E. PACKARD 2,856,579

GYROMAGNETIC RESONANCE MAGNETOMETER

Filed July 1, 1954

4 Sheets-Sheet 2

Martin E. Packard
INVENTOR.

BY
Paul D. Hunter
ATTORNEY

Oct. 14, 1958 M. E. PACKARD 2,856,579
GYROMAGNETIC RESONANCE MAGNETOMETER
Filed July 1, 1954 4 Sheets-Sheet 3
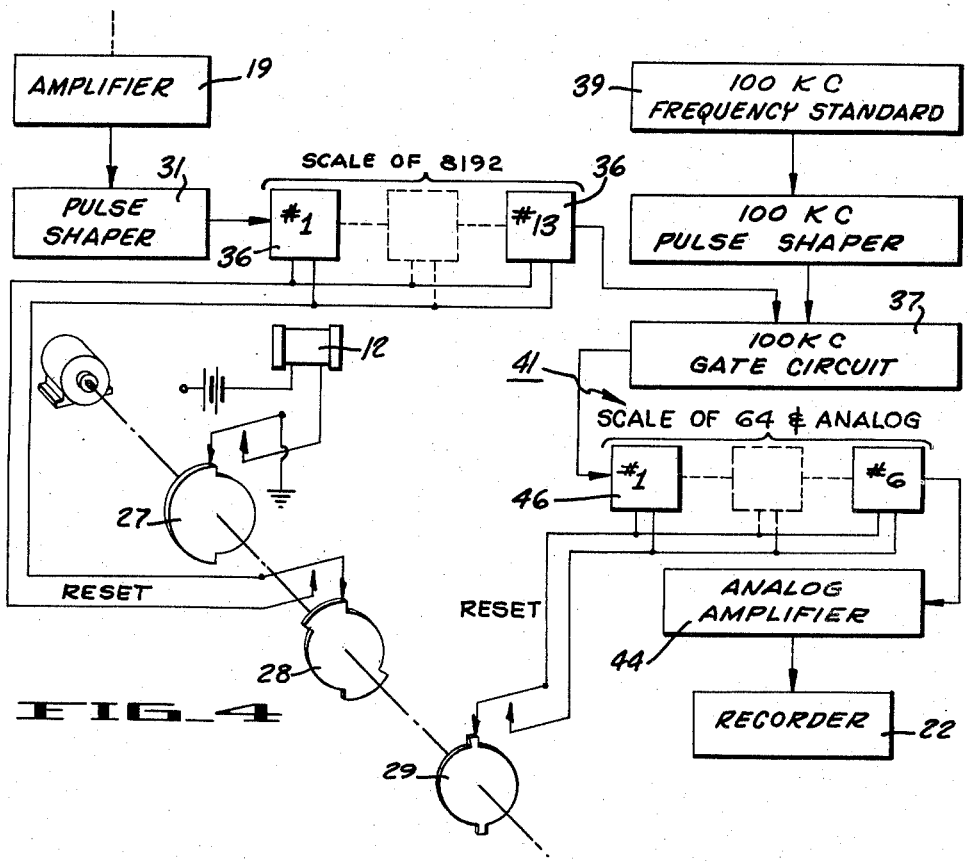
FIG_4
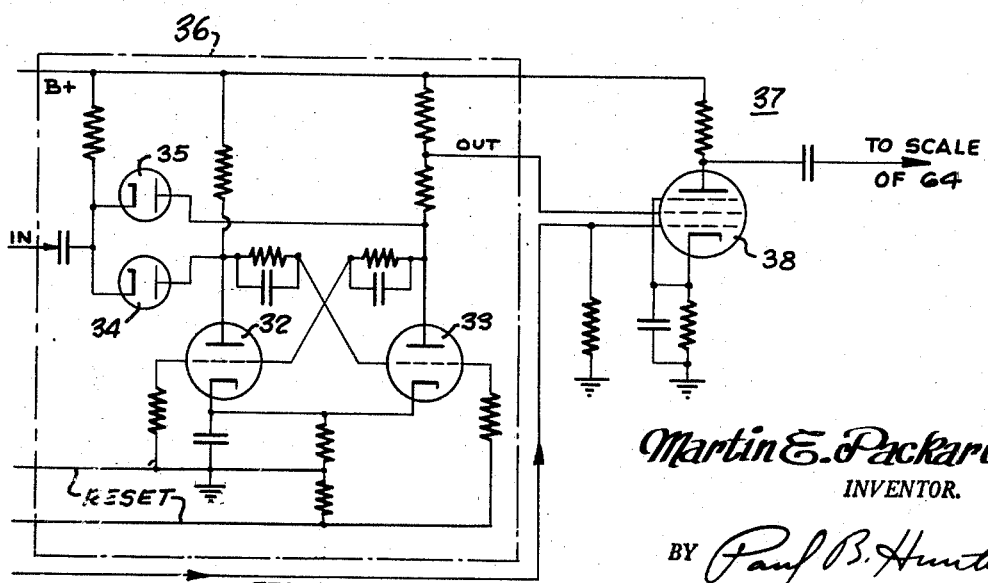
FIG_5
Martin E. Packard
INVENTOR.
BY Paul B. Hunter
ATTORNEY

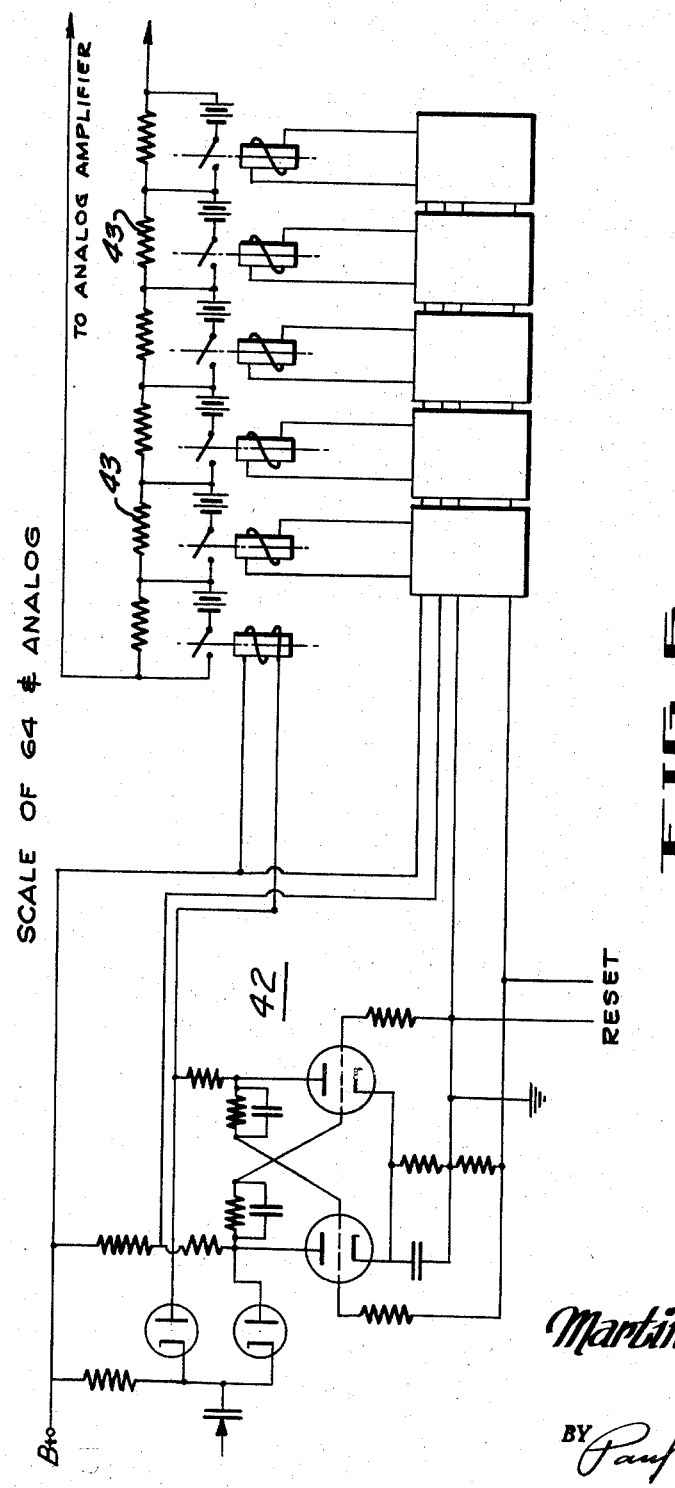
FIG_5

United States Patent Office 2,856,579
Patented Oct. 14, 1958

2,856,579
GYROMAGNETIC RESONANCE MAGNETOMETER

Martin E. Packard, Menlo Park, Calif., assignor to Varian Associates, San Carlos, Calif., a corporation of California Application July 1, 1954, Serial No. 440,703

16 Claims. (Cl. 324—.5)

This invention relates in general to magnetometers and, more particularly, to magnetometers which utilize the principle of nuclear free precession in the earth's magnetic field, whereby the earth's magnetic field may be measured and anomalies therein detected for the purpose of geophysical prospecting, location of foreign bodies in the field and the like.

This invention utilizes the principle of gyromagnetic precession and more specifically gyromagnetic free precession in magnetic fields which is set forth and extensively described in U. S. Patent Re. 23,769 of Russell H. Varian issued on January 12, 1954, and entitled, "Method and Means for Correlating Nuclear Properties of Atoms and Magnetic Fields." This above cited patent discloses the method and means for measuring the strength of a magnetic field, for example, the earth's magnetic field, which involves determining the frequency of precession at which known atom portions possessing the properties of gyroscopic moment and magnetic moment, for example, nuclei, will precess in the unknown magnetic field, whereby the value of this frequency may be used to derive the strength of the magnetic field. The nuclei, which, for example, may be protons in water, are first polarized in a magnetic field which is much stronger than and which is at an angle to the magnetic field to be measured. The nuclei are thus polarized in the direction of this strong magnetic field which, for example, may be normal to the magnetic field to be measured. After polarizing the nuclei, the strong magnetic field is quickly removed and the polarized nuclei then immediately begin to precess about the axis of the magnetic field to be measured. The nuclei will precess at a definite rate which is determined by the particular kind of nuclei and by the strength of the unknown magnetic field, this relationship being set forth by the well known gyromagnetic formula $\omega = \gamma H$, where $\omega$ is the angular rate of precession, $\gamma$ is the gyromagnetic ratio of the nuclei, and H is the strength of the magnetic field to be measured. The gyromagnetic ratio of the nuclei is known and, by determining the angular rate of precession or the frequency of precession, the strength of the unknown magnetic field may be easily calculated.

The frequency of precession may be determined by coupling a receiver coil to the matter containing the nuclei whereby the sweeping magnetic moments of the precessing nuclei induce an alternating current in the receiver coil of the precession frequency. This induced signal, which is extremely small, is transmitted to a suitable amplifier system and is then transmitted to suitable frequency determining electronic circuitry such as an electronic counter system.

The apparatus and method of the above patent, which is very useful for measuring unknown magnetic fields at fixed points in the field or while moving at a relatively slow speed across the field, is not as effective for making periodic and rapid magnetic field measurements while moving rapidly over the field, such as is the case when making such measurements of the earth's field from a rapidly moving airplane, mainly because of the wide surface area covered between successive readings of the instrument.

It is therefore a principal object of the present invention to provide a novel method and apparatus utilizing gyromagnetic free precession to make rapid periodic field measurements while traversing the unknown magnetic field at high speeds.

One feature of the present invention is to provide a novel gyromagnetic free precession apparatus and method for measuring an unknown magnetic field such as the earth's magnetic field wherein a plurality of magnetometer units are employed to operate simultaneously yet out of step with each other wherein one unit will be polarizing its associated gyromagnetic portions of atoms while another unit is detecting the precession frequency of its associated atom portions.

Another feature of the present invention is the provision of novel method and apparatus utilized in conjunction with the above feature whereby operation will be such that the strong polarizing magnetic field being produced at one instant of time by one of the magnetometer units will not affect the precession of the atom portions in the magnetic field being measured by another of the magnetometer units.

Figure 2:
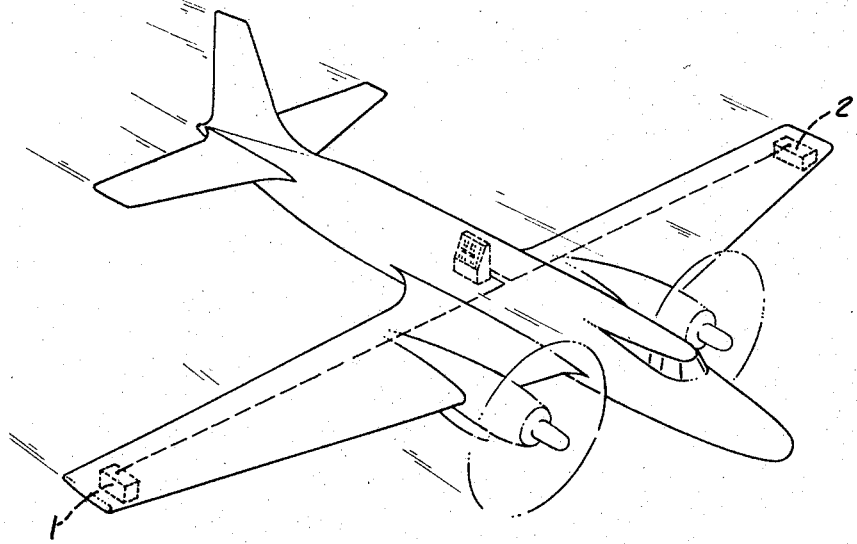
Figure 3:
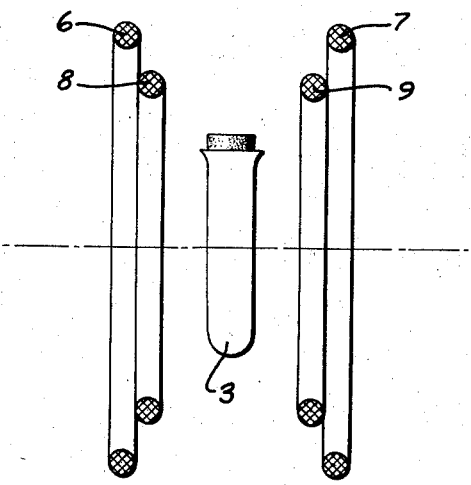

These and other features and advantages will become apparent from a perusal of the following specification and claims taken in connection with the accompanying drawings wherein Fig. 1 shows in schematic and block diagram form one embodiment of the present invention, the head portions of each of the magnetometer units being shown in schematic form and the associated electrical circuits being shown in block diagram, Fig. 2 is a view showing the pair of magnetometer units or heads positioned in the opposed wing tips of an airplane and having their associated electrical connections extend to a common control panel within the fuselage, Fig. 3 is a schematic diagram showing relative positioning between the polarizing coil windings and the sample of matter having the known nuclei therein, the particular polarizing coil structure being such that the strong polarizing magnetic field produced thereby is substantially confined within the boundaries defined by the outer windings of the polarizing coils, Fig. 4 is a more detailed circuit diagram of a portion of the system shown in Fig. 1, Fig. 5 shows the detailed circuitry of one of the "scale-of-two" circuits in the scale-of-8192 chain included in the circuitry of Fig. 4, and Fig. 6 shows the circuit of one of the "scale-of-two" circuits in the scale-of-64 chain and associated relay-controlled analog circuit used in this particular embodiment of the invention.

Referring now to Fig. 1, there are shown two magnetometer units or heads 1 and 2 which are included in this particular embodiment of the invention. These head portions, for the purpose of this illustration, are identical and therefore only one will be completely described, the corresponding elements of the other head bearing similar reference numerals but having a prime accent thereafter. The heads 1 and 2 include a volume of matter containing portions of atoms possessing the properties of gyroscopic moment and magnetic moment which, in this example, we will take to be water and the protons therein, this water being held in a suitable container such as a glass tube 3 with a stopper 4 therein. This tube may be of a size to hold 500 cc. of water. Other examples of a suitable matter would be ethyl alcohol and manganese sulfate.

Wound about this container 3 is a receiver coil 5. Positioned so as to envelop the container 3 is a polarizing coil which comprises two outer windings 6 and 7 and two inner windings 8 and 9, these four windings being connected in series. The reason for the particular configuration of the polarizing coil will be subsequently described, it sufficing for the time to state that the polarizing coil, when energized, will produce a strong magnetic field in the plane of the sheet of drawings normal to the axis of receiver coil 5.

The heads 1 and 2 are spaced some selected distance apart which, for example, may be 10 feet or 100 feet and are positioned so that the unknown magnetic field to be measured is at an angle with respect to the polarizing field which the polarizing coils will produce. In this particular illustration we will assume that the direction of the magnetic field to be measured is normal to the plane of the sheet of drawings.

In operation, a sequence circuit 11 is utilized for switching the circuitry of the system from one head to the other head and for also triggering the counter system so that accurate measurement of the frequencies of precession will be obtained. This sequence circuit may be motor driven cam apparatus or may be an electronic timer circuit as desired. The sequence circuit 11 is arranged to alternately operate and release the control relay 12 in a periodic manner, and we will assume for this illustration that the relay is operated three seconds and released three seconds in every six second period. With the relay 12 in its released position, the D. C. power supply 13 is closed through break contacts 14 and through a suitable damping circuit 15 to the serially connected polarizing coil windings in head 1. Thus a D. C. current flows through the polarizing coil windings and a strong polarizing field is produced which is assumed normal to the unknown magnetic field and which penetrates the water in container 3. The protons in the water are thus polarized in this particular direction. Three seconds after the first closure of contacts 14 the sequence circuit 11 operates relay 12 and the contacts 14 are opened and make contacts 16 closed, the power supply 13 thus being switched from the polarizing coil windings of head 1 to the polarizing coil windings of head 2. The D. C. current from the power supply 13 then flows through the polarizing coil of head 2 and thus produces a polarizing field normal to the field to be measured and enveloping the water to thus polarize the protons in the head 2. The damping circuits in this embodiment comprise a non-linear resistor 24 connected in series with a parallel-connected resistor 25 and condenser 26, this circuitry serving to rapidly damp out any oscillations of current in the polarizing coils which occur when the polarizing circuit is first opened.

Upon the opening of the circuit at contacts 14 to the polarizing coil in head 1, the protons therein commence to precess in the magnetic field to be measured at a rate which is determined by the strength of the unknown field. The precessing protons produce an alternating magnetic field which induces an alternating current in the receiver coil 5 of head 1, this induced signal being transmitted through preamplifier 17 and through the make contact 18 of relay 12 to a suitable amplifier 19. This amplified alternating signal is then transmitted to a frequency counter system 21. The sequence circuit also transmits suitable trigger pulses to the counter system for triggering the system to accurately determine the frequency of the induced ratio frequency signal. This resultant frequency may then be recorded on recorder 22 and from this the field strength of the unknown field may be readily calculated. Suitable correlation equipment may be utilized which will read directly in field strength or relative changes in field strength, thus eliminating the step of calculating. An oscilloscope 23 is shown coupled to the output of amplifier 19 and receives a synchronized signal from the sequencer 11, whereby a visual display of the induced receiver signals is obtained.

While the frequency of precession of the protons in the head 1 is being detected and recorded, the protons in the water in head 2 are being polarized. When the relay 12 releases, the receiver coil 5' in head 2 is connected to the frequency counter system and the polarizing power supply 13 is switched from the polarizing coil of head 2 to the polarizing coil of head 1. The nuclei or protons in head 2 then precess in the unknown magnetic field and this frequency of precession is determined and recorded while the nuclei or protons in the head 1 are being polarized.

Thus the heads 1 and 2 are caused to operate continuously and simultaneously yet out of phase so that the nuclei in one are being polarized at the same time the nuclei in the other are precessing in the unknown magnetic field. Thus the unknown field is being measured at a rate twice that which would be accomplished by one magnetometer apparatus being operated periodically or two magnetometer apparatus being operated alternately but without any overlapping operations. Thus this novel system provides rapid periodic measurement of an unknown magnetic field and is thus especially adapted for use in applications where the field measurements are being made in a magnetic field which is being very rapidly traversed as is the case in measurements of the earth's magnetic field in airborne magnetometer use. It is also especially useful in making rapid periodic field measurements at fixed points in a magnetic field such as the earth's where the object is to detect anomalies in the field occurring during the rapid passage through the field of a foreign object such as a vehicle or a ship or a person carrying a magnetic object.

Referring to Fig. 2, the two magnetometer units 1 and 2 are shown positioned in the wing tips of an airplane which is flying over the earth's surface. The electrical connections from the units are carried to a common panel within the body of the plane. This arrangement is shown only as one preferred arrangement, it being possible to locate the units at various other points in the craft or in one or more birds adapted to be towed by the airplane.

It was assumed in the above illustration that the periods of polarizing and free precession were each three seconds but this time period is merely illustrative. The periods may be varied from this by selection of suitable gyromagnetic matter. For example, some measurements may be accomplished in periods as small as $\frac{1}{10}$ second for polarizing and $\frac{1}{10}$ second for free precession and possibly shorter.

Since one of the magnetometer units will be detecting the precession of its associated nuclei in the magnetic field to be measured while the other magnetometer unit is polarizing its associated nuclei with a strong magnetic field, it is imperative that this strong polarizing magnetic field be prevented from affecting the field being measured at the unit in which precessions are taking place. Any change made in the strength of the field being measured would result in a change in the precession frequency and a true field measurement would not be obtained. It is therefore necessary that each magnetometer unit be shielded from the fields produced by the other units. There is disclosed in this embodiment of the novel invention one method and apparatus for preventing the polarizing field set up at any of the magnetometer units from changing or affecting the field being measured at another unit which comprises a variation of the method employing one flux ball within another. When one flux ball is located within another in a proper manner, the magnetic field extending outside the outer ball may be substantially cancelled. Each flux ball may take the form of a hollow metal elliptical-shaped current carrying ball or in another instance may take the form of a plurality of separate coils connected in series, the coils being positioned to form a hollow elliptical envelope. In the particular embodiment herein shown, the polarizing coil in each unit is made up of two pairs of Helmholtz coils, an inner, smaller diameter pair 8 and 9 and an outer, larger diameter pair 6 and 7. These coils are shown in cross-section in Fig. 3. The coils are all in parallel planes, the radius of each of the smaller coils being equal to the distance between the two smaller coils and the radius of the larger coils being equal to the distance between the two larger coils, these relationships being characteristic of Helmholtz coils. As known in the art, the arrangement of a Helmholtz coil pair gives the optimum intensity of magnetic field at the center thereof, other factors being equal.

The inner pair of coils 8 and 9, which makes up one flux ball, are wound so as to give a field in opposition to the field produced by the outer coils 6 and 7 which make up the other flux ball, this latter field being approximately half the field strength as the field produced by coils 8 and 9. From this particular arrangement of the coils, there is very little magnetic field extending externally of the four coils, this arrangement being a simplified version of a flux ball arrangement. The bulk of the internal field returns between the two opposed pairs, and the small external field varies inversely with the seventh power of the distance from the flux balls. Since this external field falls off so rapidly, the magnetometer heads are each isolated or shielded from the magnetic fields produced by the other heads.

Referring to Figs. 4, 5 and 6, there is shown in more detail a preferred counter system 21 and associated equipment which may be employed in the dual magnetometer system disclosed in Fig. 1. The sequence circuit 11 includes three motor driven cams 27, 28 and 29, cam 27 controlling the equally timed operation and release of relay 12. The amplified radio frequency signal from amplifier 19 is transmitted to a pulse shaper 31 where the signal envelope is shaped into square wave pulses. The output signal from the pulse shaper 31 is then transmitted to a scale-of-8192 system which comprises a chain of thirteen similar scale-of-two circuits. The last scale-of-two circuit in this chain is shown in detail in Fig. 5. The scale-of-two circuits are of a known design based on a flip-flop circuit, including two triodes 32 and 33, that is symmetrically coupled to a single source of triggering pulses and is capable of being triggered alternately from one state to the other by the successive, identical trigger pulses from the pulse shaper 31. The output from the first twelve scale-of-two circuits is taken from a mid-tap point on the plate resistor of triode 32 while the output of the thirteenth and last scale-of-two circuit is taken from the plate resistor of triode 33 as shown in Fig. 5. Symmetrical coupling through the two diodes 34 and 35 to the trigger input is utilized, negative pulses being used to operate the scale-of-two circuits. This scale-of-8192 operates in such a manner that when the reset circuit is closed at the cam 28 a moment after the operation or release of the relay 12, the first pulse received from the pulse shaper 31 after the closure of the reset circuit is transmitted through the scale-of-8192 circuit to the gate circuit 37. The gate circuit 37, which includes the pentode 38, is rendered conductive in response to this first pulse received by the scale-of-8192 circuit and thus transmits the radio frequency pulses, which is shown to be 100 kilocycles in this embodiment, from the highly stabilized frequency standard 39 through to the scale-of-64 and associated analog circuit 41. The gate circuit 37 will continue to permit the flow of pulses from the standard 39 to pass through it until the scale-of-8192 receives the 4097th pulse at which time the gate circuit pentode is biased to cut-off and the flow of pulses to the scale-of-64 circuit 41 halted.

The scale-of-64 circuit 41 consists of six scale-of-two circuits connected in a chain, the first of which 42 is shown in detail in Fig. 6. The output of each of the scale-of-two circuits is coupled to a relay individual to each scale-of-two, make contacts on the six relays being coupled in an analog circuit which includes a plurality of series connected resistors 43 and associated electrical energy supplies shown as batteries.

As the pulses from the frequency standard are received by the scale-of-64 circuit, the associated relays are energized and deenergized in a rapid, repetitious manner until such time as the gate circuit operates to halt the pulses. The last pulse received will leave the different relays in the chain operated or released in a pattern which will be dependent on the total number of pulses received by the scale-of-64. The set pattern in which the relays remain will in turn result in a voltage output from the analog circuit, the amplitude of which is uniquely related to the number of the particular pulse last received. The voltage output is transmitted to a suitable amplifier circuit 44 and then to the recorder 22 where the amplitude of the voltage may be recorded. The scale-of-64 is reset before the next magnetometer reading when the cam 29 operates to momentarily open the reset circuit to the chain of scale-of-two circuits.

It should be understood that there is shown and described only two magnetometer units but that this invention is not limited to the use of two but may employ three or more magnetometers properly synchronized and all working out of step. The magnetometer units shown in the drawings employ a common power supply and receiving and recording system but it is understood that separate self-sustaining magnetometer systems could be employed with means for operating them out of step. Also, magnetic field shielding means other than or in addition to the flux ball may be employed.

Each magnetometer unit shown in the drawings includes separate polarizing coils and pickup coils but it should be noted that one coil may serve the dual purpose in each magnetometer unit of polarizing and receiving, this dual use of a single coil being disclosed in the above cited Patent Reissue 23,769. For example, the coils 8' and 9' in Fig. 1, in addition to supplying the polarizing magnetic field, may be adapted to take over the function of the receiver coil 5', in which case means would be provided for switching the coils 8' and 9' to the preamplifier 17 after being disconnected from the power supply 13.

Since many modifications and variations may be made in the described method and apparatus without departing from the spirit of the invention, the foregoing description is to be considered as exemplary and not in a limiting sense.

What is claimed is:

1. Apparatus for measuring the strength of a magnetic field which comprises a plurality of magnetometer units located in the magnetic field, each magnetometer unit having an energizing stage of operation followed by a field measuring stage of operation, means for operating said units in time sequence such that while one of said units is in the energizing stage of operation another of said units is in the field measuring stage of operation, and means for sequentially switching the associated recording apparatus to each unit during its related field measuring stage of operation.

2. Apparatus for making periodic measurements of the strength of a magnetic field with a plurality of gyromagnetic free precession magnetometer units located in the magnetic field, each magnetometer unit including an ensemble of atom portions having gyromagnetic properties with means for first polarizing the atom portions and aligning them at an angle to the magnetic field to be measured and then terminating said polarization to allow said atom portions to precess, in the magnetic field to be measured whereby the strength of the field may be determined, which comprises means for operating said units in time sequence such that while the atom portions in one unit are being polarized the atom portions in another unit are precessing in the magnetic field to be measured.

3. Apparatus for making periodic measurements of the strength of a magnetic field as claimed in claim 2 which comprises means for sequentially switching a common recording apparatus from unit to unit whereby the recording apparatus is associated with each unit during its particular atom portion precession stage.

4. Apparatus for periodically measuring the strength of a magnetic field with a plurality of separate nuclear free precession magnetometer units each containing nuclei possessing the properties of gyroscopic moment and magnetic moment which comprises magnetic field means for periodically polarizing the nuclei in each of the units and aligning them in the magnetic field being measured and for removing the polarization whereby the nuclei in each unit may precess in the magnetic field to be measured, and means for determining the frequency of precession of the nuclei, the polarization being applied to and removed from the nuclei in each unit in a time sequence such that while one unit is in the polarizing condition another unit is in the free precession condition.

5. Apparatus for making rapid periodic airborne magnetometer measurements with a plurality of gyromagnetic free precession magnetometer units being transported through the earth's magnetic field by an airplane flying over the earth's surface, which comprises means for periodically polarizing the atom portions in each of the magnetometer units in sequence with magnetic fields stronger than and at an angle to the earth's field and removing the polarizing field, such that the atom portions may precess in the earth's magnetic field, means for detecting the precession of the atom portions in each magnetometer unit in sequence, and means for indicating the frequencies of said precessions whereby the strength of the earth's field may be periodically obtained, the magnetometer units being operated in sequence whereby while one of said units is in the polarizing stage of operation another of said units is in the free precession stage of operation.

6. In combination, a plurality of magnetometer units adapted to measure the strength of a magnetic field, each of said magnetometer units having an energizing stage of operation followed by a field measuring stage of operation, and means for operating said magnetometer units in time sequence such that while one of said magnetometer units is in the energizing stage of operation another of said magnetometer units is in the field measuring stage of operation.

7. In combination, a plurality of gyromagnetic free precession magnetometer units each containing a volume of matter containing portions of atoms possessing the properties of gyroscopic moment and magnetic moment, said units adapted to be positioned in a magnetic field to be measured, means in each unit for applying polarizing magnetic fields to the atom portions in the associated volume stronger than and at an angle to said first magnetic field to polarize the atom portions in the respective volumes, means in each unit for detecting the precession of the atom portions in the associated volume in the first magnetic field after removal of the associated polarizing field, and means for sequentially energizing and de-energizing said polarizing field means such that while one of said units is in the polarizing stage of operation another of said units is in the atom portion precession stage of operation.

8. A combination as claimed in claim 7 including means for shielding each of said volumes of matter from the polarizing magnetic fields applied to the other volumes of matter.

9. A combination as claimed in claim 8 wherein said shielding means comprises flux balls enveloping each of said volumes of matter.

10. In combination, a plurality of volumes of matter containing portions of atoms possessing the properties of magnetic moment and gyroscopic moment adapted to be positioned in a first magnetic field, a plurality of magnetic field producing means, separate ones of which are associated with separate volumes for producing polarizing magnetic fields, when energized, at an angle to the first field whereby the atom portions in each of the volumes may be polarized, means coupled to each of said volumes for detecting the precession of the atom portions therein in the first field upon a removal of the associated polarizing field when said field producing means are de-energized, and means for sequentially energizing and de-energizing each of said field producing means such that while the atom portions in one of said volumes are precessing the atom portions in another volume are being polarized.

11. A combination as claimed in claim 10 including means for recording the frequency of precession of the atom portions, and means for sequentially switching the recording means from one to another of said detecting means such that the recording means is associated with each volume during the time the associated atom portions are precessing.

12. In combination, a plurality of nuclear free precession magnetometer units each containing nuclei possessing the properties of magnetic moment and gyroscopic moment adapted to be rapidly transported through the earth's magnetic field, each unit including means for producing a polarizing magnetic field stronger than and at an angle to the earth's magnetic field to thereby polarize the associated nuclei, the nuclei in each unit precessing in the earth's field upon removal of the polarizing field therefrom, means for sequentially energizing and de-energizing each of said field producing means such that while the nuclei in one of said units are precessing the nuclei in another unit are being polarized, means for indicating the precession of the atom portions in the first field, and means for switching the indicator means from unit to unit in succession such that the indicator means is associated with each unit during the time the associated nuclei are precessing.

13. In combination, a plurality of volumes of matter containing portions of atoms possessing the properties of gyroscopic moment and magnetic moment adapted to be positioned in a magnetic field, each volume of matter having a separate coil of wire inductively coupled thereto, means for transmitting a pulse of direct current through the plurality of coils periodically and in time sequence whereby a polarizing magnetic field is produced successively at each volume, said produced fields being stronger than and at an angle with respect to the first magnetic field whereby the atom portions may be periodically polarized at an angle to the first field successively in each volume, means including separate pickup coils of wire inductively coupled to each volume of matter, the precession of the atom portions in the first magnetic field after termination of the pulse of polarizing magnetic field successively in each volume inducing an alternating current in the associated pickup coil, and means coupled to said pickup coils for detecting the characteristics of the induced alternating signals such that while the atom portions in one volume are precessing the atom portions in another volume are being polarized.

14. The combination as claimed in claim 13 wherein said last means includes an electronic counter system for determining the frequency of the induced signal in the pickup coil.

15. A combination as claimed in claim 13 wherein said direct current pulse transmitting means includes a source of direct current, a switching circuit having means for switching said direct current source from one polarizing coil to another, and a sequencer means for operating said switching circuit to switch the direct current source successively from one coil to another.

16. A combination as claimed in claim 15 wherein said switching circuit couples said recorder means to said pickup coils, said sequencer means operating said switching circuit to switch the recorder successively from one pickup coil to another.

References Cited in the file of this patent

UNITED STATES PATENTS

Re. 23,769 Varian _____ Jan. 12, 1954